United States Patent

Schoenbrunn et al.

[15] 3,674,848

[45] July 4, 1972

[54] HYDRATION OF NITRILES USING METAL SALTS OF CATION EXCHANGE RESINS

[72] Inventors: Erwin Frederick Schoenbrunn, Ridgefeld; Vinod Tarkeshwar Sinha, Stamford, both of Conn.

[73] Assignee: American Cyanamid Company, Stamford, Conn.

[22] Filed: Aug. 19, 1970

[21] Appl. No.: 65,283

[52] U.S. Cl. ............... 260/558 R, 260/557 R, 260/558 A, 260/561 R, 260/561 N, 260/561 HL, 260/404
[51] Int. Cl. ............................................. C07c 103/30
[58] Field of Search ................. 260/558, 561, 559, 404, 557

[56] References Cited

UNITED STATES PATENTS 2,421,030   5/1947   Mahan ........................... 260/558

Primary Examiner—Henry R. Jiles
Assistant Examiner—Harry I. Moatz
Attorney—Gordon L. Hart

[57] ABSTRACT

Solid catalysts for hydration of nitriles to amides comprise metal salts of cation exchange resins. Group I B and II B metals are used with either strong acid or weak acid cation exchange resins. A variety of organic nitriles may be used in the process. Detailed examples describe preparation of several catalysts and the synthesis of acrylamide, acetamide and benzamide. The reactants in liquid solution are contacted with the solid catalyst at 70°–180° C.

10 Claims, No Drawings

HYDRATION OF NITRILES USING METAL SALTS OF CATION EXCHANGE RESINS

The invention relates to catalytic hydration of nitriles with water to make the corresponding amide.

It has previously been proposed to employ certain soluble copper salts as catalysts for the hydration of nitriles. U. S. Pat. No. 3,381,034, patented Apr. 30, 1968 describes the conversion of nitriles to amides by hydration of the cyano radical of a nitrile with water in the presence of a soluble copper salt catalyst.

The present invention provides a process for the purpose described but using instead of a soluble catalyst, a solid catalyst which comprises a cation exchange resin having monovalent atoms of group I B elements or divalent atoms of group II B elements substituted at the ion exchange sites on the resin molecule. These catalysts are effective in accelerating the rate of nitrile hydration and have the distinct advantage of ease of separation of the solid catalyst from the liquid reaction products.

According to the invention, a nitrile that is at lest slightly soluble in water is mixed with water and the mixture is contacted, in liquid phase at reaction temperature preferably in the range from about 70° C. to about 150° C., with a solid catalyst which comprises the metal salt of an acid cation exchange resin. This catalyst has monovalent ions of a group I B element or divalent ions of a group II B element substituted for the proton at cation exchange sites on the acid resin molecule.

Any suitable weak-acid or strong-acid cation exchange resin may be employed, as modified by substitution of monovalent ions of a group I B element or of divalent ions of a group II B element for acidic hydrogen ions at cation exchange sites in the polymeric resin molecule. The preferred cuprous catalysts for hydration of acrylonitrile are the cuprous salts of strong-acid ion exchange resins, for example, resins of the type prepared by sulfonation of a styrene-divinylbenzene copolymer or by polymerization of sulfonated styrene with a cross-linking agent such as divinylbenzene or the like. Also suitable are cuprous salts of weak-acid cation exchange resins of the type having an organic acid monomer such as acrylic, methacrylic or maleic acid co-polymerized with a co-monomer such as divinylbenzene or ethylene dimethacrylate or the like. The preferred zinc catalysts for hydration of acrylonitrile are the zinc salts of weak-acid ion exchange resins although the strong-acid resin salts of zinc are also operative as catalysts according to the invention. A variety of both the strong-acid and the weak-acid solid ion exchange resins which are available commercially will be suitable for making salts to be used as catalysts in the invention. Reference is made to the description of several ion exchange resins of both strong-acid and weak-acid cation exchange types in Encyclopedia of Chemical Technology 2nd Ed., Vol. 11, pp 874–5, Interscience Publishers 1966.

Cation exchange resins of both the strong-acid and the weak-acid type are readily available commercially under various tradenames. For example, strong-acid resins made from sulfonated copolymers of styrene and divinylbenzene are available from the Rohm and Haas Company under the tradename of Amberlite 200 or Amberlite IR 120, and from the Dow Chemical Company under the tradename of Dowex 50. Weak-acid cation exchange resins made by copolymerizing methacrylic acid and divinylbenzene are available from the Rohm and Haas Company under the tradename of Amberlite IRC-50.

Conversion of the ion exchange resin to the desired metal salt of the resin may be accomplished by any of several suitable ion exchange reactions. It is convenient, for example, to react the acid form of the resin with a slurry of the metal oxide. The acid form of the resin may also be converted to the desired metal salt by ion exchange with a solution containing the desired metal as a cation having the desired valence state. When weak-acid resins are employed, it is generally advantageous to convert the resin to the sodium or potassium form by reaction with sodium hydroxide or potassium hydroxide solution, and thereafter to convert the resin to the desired metal form by ion exchange with a salt of the selected metal, e.g., zinc chloride. The modified resin may be prepared beforehand for use in the hydration reaction, or it may be prepared in situ in the same reaction vessel that is to be used for the hydration reaction. For example, the reaction of an acid resin with an aqueous suspension of cuprous oxide is convenient for such in situ preparation. Such preparation is, in fact, a preferred method to minimize exposure of the resin salt to air which may cause partial oxidation of cuprous ion to cupric ion. Such oxidation is found to reduce the catalytic activity of the cuprous catalysts to some extent.

The solid catalysts used in accordance with the present invention make the hydration reaction quite readily adaptable to continuous flow processing. The solid catalyst can be confined in a fixed catalyst bed through which there is continuously flowed a stream of liquid reaction mixture comprising a solution of the nitrile and water reactants. The feed mixture may contain immiscible organic and aqueous liquid phases with some mutual solubility in both phases.

These solid resin salt catalysts are particularly advantageous for the nitrile hydration because they provide ease of separation of reactants and products from the catalyst and the preferred embodiments provide an additional advantage of good conversion of the nitrile to the desired amide with relatively lower conversions to by-products.

Following are examples which include the best mode presently contemplated for carrying out the invention, with detailed description of certain preferred embodiments of the invention.

EXAMPLE 1

A reaction vessel is charged with 78 parts by weight of a weak-acid cation exchange resin, identified by the tradename Amberlite IRC-50. This is a particulate solid resin having acidic hydrogen cations at the ion exchange sites on the resin molecule. Also charged to the reaction are 56 parts by wt. of cuprous oxide, 240 parts by wt. acrylonitrile (containing 0.1% by wt. hydroquinone as a polymerization inhibitor) and 72 parts by wt. of water. The vessel is purged several times with argon to exclude air, then sealed. The vessel is agitated by rocking overnight at room temperature and then is heated to 125° C. for 4 hours as the rocking is continued. The reaction of cuprous oxide with the resin to make the solid cuprous resin catalyst proceeds at room temperature; most of the nitrile hydration occurs only after the temperature is elevated. After the reaction product mixture has cooled the liquid contents are analyzed by vapor phase chromatography. It is found that 16% of the acrylonitrile has been converted to acrylamide, 2% converted to hydracrylonitrile and one percent to acrylic acid.

EXAMPLE 2

This example is a batch reaction which is carried out in the same manner described in Example 1 except 69 parts by wt. of a strong-acid cation exchange resin, identified by the tradename Amberlite 200, and 120 parts by wt. cuprous oxide are charged to the reactor instead of the amounts of the other resin and cuprous oxide described in Example 1. The product analysis in this example shows 14% conversion of acrylonitrile to acrylamide, 2% to hydracrylonitrile and 0.5% to acrylic acid.

EXAMPLE 3

The zinc salt of a weak acid ion exchange resin is prepared in two steps, first making the sodium salt by treating the weak acid resin Amberlite IRC-50 in 5% by wt. NaOH aqueous solution, thereby exchanging sodium ion for acid hydrogen ions of the resin, and then exchanging zinc for sodium by treating the sodium resinate in 5–10% by wt. zinc chloride aqueous solution. The zinc resinate when washed and dried is then ready for charging to the reactor.

A vessel containing 1.2 parts by wt. acrylonitrile, 1.5 parts by wt. water, 0.001 parts by wt. hydroquinone as a polymerization inhibitor, and 0.5 parts by wt. Amberlite IRC-50 cation exchange resin as modified with zinc ions at exchangeable sites on the resin molecule is sealed and agitated by rocking at 125° C. for 4 hours. The product is cooled to room temperature and analyzed by vapor-phase chromatography. Results of this analysis show that 13% of the acrylonitrile has been converted to acrylamide and 1% to hydracrylonitrile.

EXAMPLE 4

A cylindrical reactor having 2 inch internal diameter and 10 inches long is charged with 200 g. of Amberlite IRC-50 treated as in Example 3, having substituted zinc ions at the exchangeable ion sites. The reactor is maintained at 105° C. reaction temperature by immersion in an oil bath. Water is pumped upward through the bed at 1.4 g/minute concurrently with 1.6 g/minute of acrylonitrile (containing 0.1% hydroquinone as a polymerization inhibitor). A back pressure regulator set at about 70 psig maintains internal pressure in the reactor so the reactor contents remain in liquid state at the reaction temperature. The product emerging from the reactor is cooled to ambient temperature in a heat exchanger then removed through the back pressure valve, whereupon the pressure is reduced to atmospheric. The product is separated into two immiscible liquid phases, organic and aqueous, each of which is analyzed by vapor phase chromatography for acrylamide. The analysis show that acrylamide is produced at the rate of 0.11 g/minute.

EXAMPLE 5

The process of Example 3 is repeated in several respective runs with variations using silver ion and cadmium ion instead of zinc as the substituted cation on the IRC-50 resin in some of the runs and using acetonitrile or benzonitrile instead of acrylonitrile in some of the runs. Silver nitrate and cadmium nitrate were used to exchange silver and cadmium for sodium at the exchange sites on the resin. In all of the runs there is substantial production of the corresponding amide from each of the nitriles by all of the catalysts. Best conversion and selectivity using acrylonitrile was obtained using the zinc ion catalyst and best conversion and selectivity using acetonitrile or benzonitrile were obtained using the silver ion catalyst. Specific data for each run are tabulated in Table 1.

TABLE 1

| Run No. | Catalyst Cation on IRC-50 parts by wt. | Nitrile | Conversion Nitrile to Amide parts | Selectivity Nitrile to Amide % |
|---|---|---|---|---|
| 1 | Zn ++ 1 pbw | Acetonitrile | 11 | 100 |
| 2 | Zn ++ 1 pbw | Acrylonitrile | 23 | 95 |
| 3 | Ag + 0.7 pbw | Acetonitrile | 71 | 99 |
| 4 | Cd ++ 1 pbw | Acrylonitrile | 5 | 76 |
| 5 | Zn ++ 1 pbw | Benzonitrile | 4 | 95 + |
| 6 | Ag + 0.65 pbw | Benzonitrile | 90 | 100 |

In its broadest aspects my invention contemplates use of catalysts consisting of salts formed by weak acid and strong acid ion exchange resins with ions of groups I B and II B metals of the Periodic Table, for hydration of the cyano radicals of acid nitriles in liquid state with water to form the corresponding amides. The invention contemplates use of the defined catalysts for hydration of any suitable nitrile, such as the broad classes of nitriles described for use in the catalytic hydration processes described in U. S. Pat. No. 3,381,034, patented Apr. 30, 1968 and U. S. Pat. No. 3,366,639, patented Jan. 30, 1968. Examples of specific nitroacetonitrile, nitriles include acetonitrile, propionitrile, butyronitrile, stearonitrile, acrylonitrile, chloro-acetonitrile, nitracetonitrile, cyclohexane carbonitrile, naphthylacetonitrile, cyanogen, malononitrate, adiponitrile, terephthalonitrile, phthalonitrile, benzonitrile, succinonitrile, methacrylonitrile, crotononitrile, dicyancyclobutane, and the like.

The foregoing examples illustrate both batch and continuous processes. It will be readily apparent that adaptation of batch processes to continuous flow is simply a matter of conventional process design. For example, a fixed bed catalytic reactor can be charged with the acid ion exchange resin solids which can then be converted by ion exchange to the solid cuprous salt in situ by circulating a cuprous oxide slurry through the bed. The converted catalyst is then used as a fixed catalyst bed for hydration of nitrile in a liquid reaction mixture with water. This mixture is passed through the catalyst bed in liquid phase at reaction temperature in the range from about 70° C. to about 180° C. The only pressure needed will be sufficient pressure to maintain the liquid phase at the operating temperature. It is sufficient to maintain autogenic pressure as the liquid phase reaction mixture is heated to reaction temperature. Higher pressure may be used if desired.

The ratio of water to nitrile in the reaction mixture may range from about 0.05 to about 20 moles water per mole of nitrile. It is preferred to operate with an excess of nitrile in the mixture to simplify the separation of amide product from the reaction product mixture but the hydration reaction will proceed in any mixture of reactants in any proportion. Generally, the reaction rate will increase as the ratio of catalyst to reactants is increased but suitable reactions may be carried out in batch processes with from about 0.1 to about 10 grams of catalyst per gram of nitrile reactant and in continuous process with contact time from about 0.5 to about 10 hours. We define contact time as the total volume of the catalyst bed, e.g., in cubic feet of gross catalyst volume, divided by the total volume flow rate of the liquid reactants, e.g., in cu. ft. liquid volume per hour.

The solid resin salts of the monovalent ions of group I B metals and of the divalent ions of group II B metals all have good stability and do not require frequent regeneration. Excessive contact with oxygen should be avoided when using oxidizable cations such as cuprous ions. The activity of the catalyst will fall off if the active metal cations are lost from the resin. This may happen if the feed mixture contains inactive cations, or if acid by-products are formed in the reaction. When this occurs, the resin may be regenerated as its activity drops below a desired level by replenishing the active cations on the resin by any ion exchange operation, such as those methods described for initially preparing the catalyst. The catalyst may be maintained at high activity by incorporating in the feedstock small amounts of a soluble salt containing the active metal cation either continuously or from time to time as needed.

The effectiveness of the catalyst is dependent on the amount of monovalent cations from group I B or divalent cations from group II B contained in the catalyst. The catalyst may contain any selected member of the class of effective cations singly, or it may contain several such members in a mixed salt catalyst. Other cations in addition to those members of the effective class may also be absorbed on the resin if desired.

Reaction conditions should be chosen so as to prevent excessive degradation of the nitrile reactant and the amide product. For example, if the starting nitrile contains an olefinic group, a polymerization inhibitor, such as hydroquinone or thiophene may be used.

We claim:

1. A process for producing an amide product by catalytic hydration with water of the cyano radical of a nitrile that is at least slightly soluble in water, said process comprising contacting a reaction mixture comprising the nitrile and water reactants in liquid solution at reaction temperature in the range from about 70° C. to about 180° C. in contact with solid catalyst consisting essentially of a group I-B or group II-B metal salt of an acid cation exchange resin for time sufficient to produce amide by catalytic hydration of the nitrile reactant.

2. A process defined by claim 1 wherein said nitrile is acrylonitrile and said amide product is acrylamide.

3. A process defined by claim 1 wherein said acid cation exchange resin is a weak-acid ion exchange resin.

4. A process defined by claim 2 wherein said ion exchange resin is a weak-acid ion exchange resin.

5. A process defined by claim 1 wherein said ion exchange resin is a strong-acid ion exchange resin.

6. A process defined by claim 2 wherein said ion exchange resin is a strong-acid ion exchange resin.

7. A process defined by claim 4 wherein said salt is the zinc salt of a weak acid cation exchange resin.

8. A process defined by claim 6 wherein said salt is the cuprous salt of a strong acid cation exchange resin.

9. A process defined by claim 1 wherein said nitrile is acetonitrile and said catalyst is the silver salt of a weak acid cation exchange resin.

10. A process defined by claim 1 wherein said nitrile is benzonitrile and said catalyst is the silver salt of a weak acid cation exchange resin.

* * * * *

UNITED STATES PATENT OFFICE
CERTIFICATE OF CORRECTION

Patent No. 3,674,848          Dated July 4, 1972

Inventor(s) ERWIN FREDERICK SCHOENBRUNN AND VINOD TARKESHWAR SINHA

It is certified that error appears in the above-identified patent and that said Letters Patent are hereby corrected as shown below:

Column 1, line 21 delete "lest" and substitute -- least -- .

Column 4, line 3 delete "nitroacetonitrile," and substitute -- suitable -- .

Column 4, line 5 delete "nitracetonitrile" and substitute -- nitroacetonitrile -- .

Signed and sealed this 5th day of December 1972.

(SEAL)
Attest:

EDWARD M. FLETCHER, JR.
Attesting Officer

ROBERT GOTTSCHALK
Commissioner of Patents